May 7, 1957 S. D. RUSSELL 2,791,172
BALE COMPRESSING MEANS
Filed Oct. 16, 1952
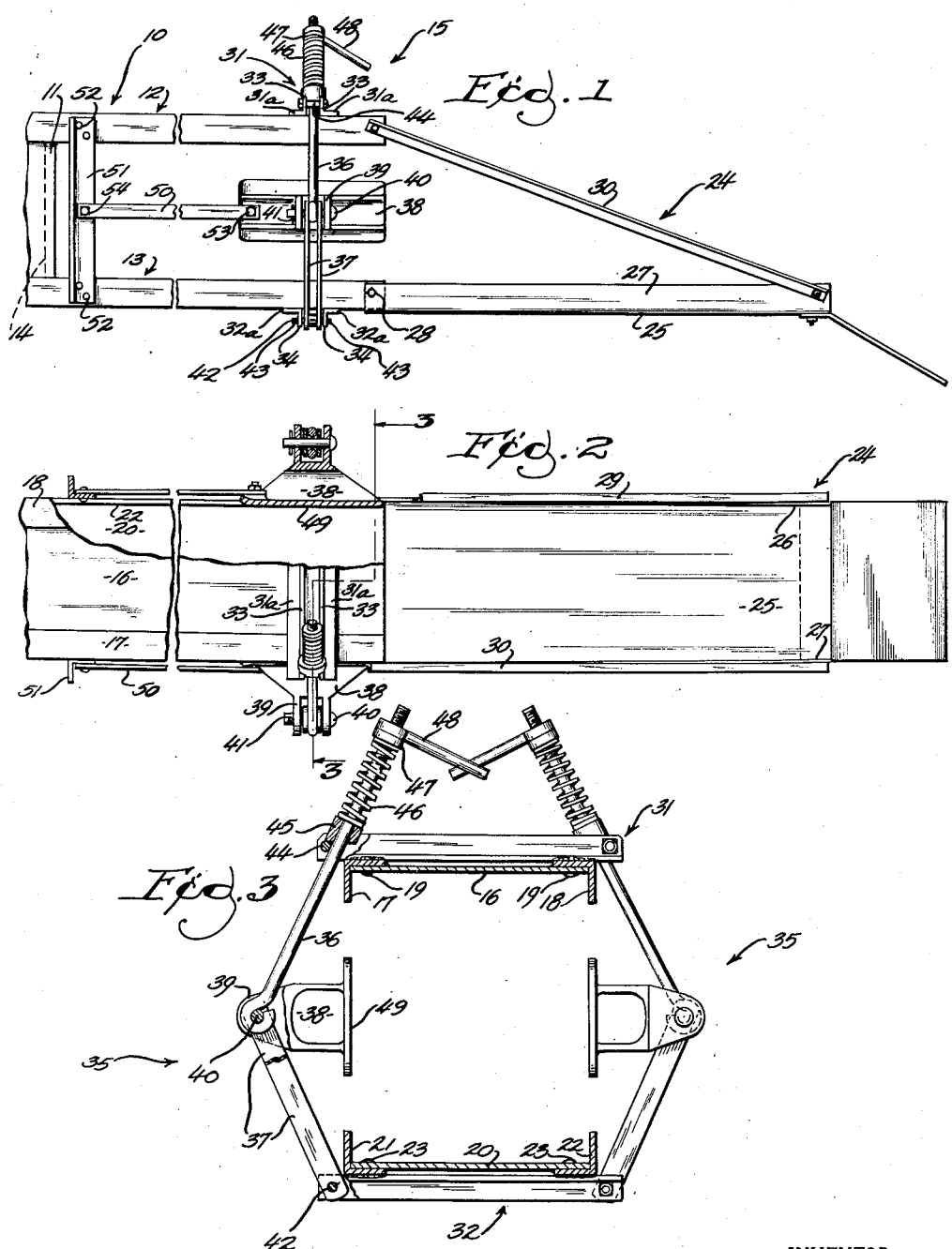
INVENTOR.
STANLEY D. RUSSELL
BY
ATTORNEY

United States Patent Office 2,791,172
Patented May 7, 1957

2,791,172
BALE COMPRESSING MEANS

Stanley D. Russell, Racine, Wis., assignor to J. I. Case Company, Racine, Wis., a corporation of Wisconsin Application October 16, 1952, Serial No. 315,099

4 Claims. (Cl. 100—192)

The present invention relates to balers and more particularly to a new and novel means for compressing a bale in a baling chamber so as to offer sufficient resistance to the free movement of the bale through the chamber. A primary object of the present invention therefore is to generally improve the operation and construction of mechanisms of this type.

A further object of the present invention is to provide improved means for offering resistance to the free movement of the bale through the chamber, this means compressing the bale in two directions in intersecting planes in response to an adjustment in one direction.

Further objects and advantages of the invention will be apparent from the following specification and accompanying drawings in which a satisfactory embodiment of the invention is shown. However, it is to be understood that the invention is not limited to the details disclosed, but includes all such variations and modifications as fall within the spirit of the invention as herein expressed.

In the drawings:

Fig. 1, is a left-side elevation of so much of a baler as necessary to illustrate the present invention.

Fig. 2, is a plan view of the structure shown in Fig. 1, with parts broken away to more clearly show details in construction.

Fig. 3, is a vertical sectional view on the line 3—3 of Fig. 2.

Referring to Fig. 1 of the drawings, the baler to which the invention applies, being only partly shown but being preferably of the type shown and described in the patent to Russell, No. 2,362,861, granted November 14, 1944, includes a chamber generally designated as 10 of the type disclosed in applicant's above identified patent including side members or plates 11 and upper and lower members 12 and 13 between which is reciprocable a compressing plunger 14. Fibrous material is fed into the chamber in any suitable or well-known manner not necessary to illustrate and is compressed and forced backwardly between members 12 and 13, the free movement of the material previously compressed backwardly through the chamber being frictionally resisted so that this material forms an abutment against which material is compressed by plunger 14.

Upon the occurrence of different conditions, it is desirable to vary the intensity of this frictional resistance, and in prior constructions, such as disclosed in my Patent No. 2,411,467, granted November 19, 1946, it is common to compress the baler by means of suitable tension rods adjacent the rear end of the baling chamber. The present invention contemplates the use of a compressor unit generally designated as 15 for effecting resistance to the free movement of a bale through the chamber, in intersecting planes in response to an adjustment of the unit in one plane.

Member 12 in the present instance comprises a plate 16 having angle irons 17 and 18 united therewith by rivets or the like 19. Angle irons 17 and 18 therefore provide down turned flanges at the edges of plate 16. In similar manner member 13 comprises a plate 20 having angle irons 21 and 22 united therewith by rivets or the like 23.

Member 13 carries an extension generally designated as 24 and comprising a plate 25 having upwardly turned edge flanges 26 and 27, said plate 25 receiving the rearward end of the member 13 and secured thereto as by suitable bolts 28 received in suitable apertures formed in the respective angle irons 21 and 22 and in the respective upwardly turned edge flanges 26 and 27. The extension 24 projects rearwardly from the discharge end of the baling chamber and is secured in this position by means of elements 29 and 30 which are suitably secured between the angle irons 17 and 18 of the member 12 and the flanges 26 and 27 of the plate 25. In this position the extension 24 acts as a shelf over which bales may be discharged and owing to the smooth surface of the plate 25 the bales slide easily over the plate without confinement.

The compressor unit 15 comprises upper and lower elements 31 and 32 respectively which extend across the width of the baling chamber in contact with the members 12 and 13. The element 31 is fabricated from a pair of angle irons 31a which are fixed to the angle irons 17 and 18 as by welding or the like so that the vertical flanges 33 of the respective angle irons are fixed in a predetermined spaced relationship. The element 32 is likewise fabricated from a pair of angle irons 32a each of which is welded to the angle irons 21 and 22 so that vertically extending flanges 34 of the respective angle irons are positioned in a predetermined spaced relationship, the element 32 being in vertical alignment with respect to the element 31.

A toggle element 35 is interconnected between the elements 31 and 32 on each side of the baling chamber, and since these toggle elements are identical in construction, only one will be described in detail except insofar as the construction of both of the mechanisms is deemed necessary in order to fully describe the principle of the present invention. The toggle element 35 includes a tension rod 36 and a pair of tension straps 37. Adjacent the interconnection of the tension rod 36 with the tension straps 37 is positioned a shoe 38 which has a suitable laterally extending clevis 39 formed thereon, and the tension rod 36, the tension straps 37, and the clevis 39 are each suitably apertured for receiving therein a connecting pin 40, the pin 40 being provided with a suitable cotter pin 41 for well-known purposes. Adjacent the other ends of the tension straps 37 are formed suitable apertures for receiving therein a suitable pin 42 carried by apertures formed in the respective flanges 34 of the element 32, and cotter pins 43 are received in the pin 42 for locking the pin against axial displacement in a manner well-known in the art. The tension rod 36 extends upwardly and is received in the space formed between the flanges 33 of the element 31, and a suitable bolt 44 is received in the respective flanges 33 for confining the tension rod 36 between the bolt 44 and the angle iron 17 of the member 12. An abutment collar 45 is slidably received on the tension rod 36, and is moved into abutting relationship with respect to the upper surface of the flanges 33 by means of a suitable spring 46. Spring 46 is received on the tension rod 36 above collar 45 and a suitable thrust bearing 47 is received on the tension rod 36 above the spring 46. A suitable hand nut 48 is threaded on the tension rod 36 above the bearing 47 and serves to compress the spring 46 between the bearing 47 and the collar 45. The pin 40 is spaced outwardly from the margins of the plates 16 and 20, preferably an appropriate distance to extend the tension rod 36 and links 37 at an angle to each other within the range of 115° and 150°.

It will be noticed that the shoe 38 is provided with a frictional surface 49 of substantial area, and a stabilizing bar 50 is interconnected between shoe 38 and a bracket 51 secured between angle irons 17 and 21 as by rivets or the like 52. The stabilizing bar 50 is secured to the shoe 38 as by a bolt or the like 53 and to the bracket 51 by means of a bolt or the like 54, and the primary function of the stabilizing bar 52 is to maintain the surface 49 of the shoe 38 in a plane substantially normal to the longitudinal or horizontal plane of the baling chamber and to take the backward thrust caused by the friction on the surfaces 49 of the backwardly moving bale.

In the operation of this compressor unit, the compressive force of the spring 46 tends to urge the tension rod 36 axially upwardly through the collar 45, and this axial movement of the tension rod 36 moves the shoe 38 inwardly toward the baling chamber, the surface 49 thereof remaining normal to the horizontal plane of the baling chamber by virtue of stabilizing bar 50. Therefore, upon the bales being urged rearwardly through the baling chamber, and tending to swell or bulge slightly under the internal pressure developed by the plunger 14, said bales will come into contact with the surface 49 of the shoe 38 and will tend to urge the shoe 38 outwardly. This movement of the shoe 38 outwardly will be resisted by the compressive force of the spring 46 and this compressive force of the spring 46 will be transmitted to the members 12 and 13 thereby tending to urge these members toward one another so as to compress the end of the baling chamber. The toggle elements 35 are interconnected between the elements 31 and 32 on each side of the baling chamber as previously suggested. It will be appreciated therefore that as the bale moves through the baling chamber the force tending to move the shoes 38 outwardly or laterally acts so as to urge the members 12 and 13 toward each other, the bale being frictionally engaged therefore on all four sides. It will be further appreciated that the straps 37, the shoe 38, the tension rod 36 and the spring 46 of each of the toggle elements are so calculated that the frictional resistance offered by the shoes 38 tending to retard the free movement of the bale through the chamber is substantially equal to the frictional resistance offered by the members 12 and 13 when the same are urged toward one another by reason of the bales tending to urge the shoes 38 outwardly.

The degree of resistance tending to retard the free movement of the bale through the chamber is determined by adjusting hand nuts 48 which as previously suggested determines the position of the surfaces 49 of the shoes 38 with respect to the bales moving through the baling chamber.

I claim:

1. A baling chamber having relatively movable upper and lower walls in spaced relation, side walls between the lateral ends of the upper and lower walls, said side walls comprising plates having their upper and lower edges in spaced relation to the lateral ends of the upper and lower walls, means to prevent movement of said plates longitudinally of said chamber, a pivot pin in each plate, a link connected to each pivot pin and pivotally connected to the adjacent lateral end of the lower wall, a tension rod mounted on each pivot pin and slidably connected to the upper wall, and adjustable means on the upper end of each tension rod adapted to apply force to said upper wall and through said pivot pins and said links to the lower wall and said side walls, thereby tending to urge said walls inwardly to constrict said chamber, said tension rods having slide portions adapted to cooperate with upper walls whereby said adjustment of said adjustable means will alter the force applied to the walls and plates, said links and tension rods being disposed to transmit outward pressure on said plates to said walls, tending to urge said walls inwardly upon passing of a bale through said chamber, the frictional resistance offered by the walls being substantially equal to the frictional resistance offered by the plates.

2. A baling chamber having relatively movable upper and lower walls in spaced relation, side walls between the lateral margins of the upper and lower walls, said side walls comprising plates having their upper and lower edges in spaced relation to the lateral margins of the upper and lower walls, means to prevent movement of said plates longitudinally of said chamber, pivot means on each plate spaced outwardly from the margins of said upper and lower walls, a link connected to each pivot means and pivotally connected to the adjacent lateral margin of the lower wall, a tension rod mounted on each pivot means and slidably connected to the upper wall, and adjustable means on the upper end of each tension rod adapted to apply force to said upper wall and through said pivot means and said links to the lower wall and, by virtue of said outward spacing of said pivot means to said side walls, tending to urge said plates and walls inwardly to constrict said chamber, said tension rods having slide portions to cooperate with said upper wall whereby adjustment of said adjustable means will alter the force applied to the walls and plates, said links and tension rods being disposed to transmit outward pressure on said plates to said walls, tending to urge said walls inwardly upon passing of a bale through said chamber, the frictional resistance offered by the walls being substantially equal to the frictional resistance offered by the plates.

3. A baling chamber having relatively movable upper and lower walls in spaced relation, side walls between the lateral margins of the upper and lower walls, said side walls comprising plates having their upper and lower edges in spaced relation to the lateral margins of the upper and lower walls, means to prevent movement of said plates longitudinally of said chamber, pivot means on each plate spaced outwardly from the margins of said upper and lower walls, a link connected to each pivot means and pivotally connected to the adjacent lateral margin of the lower wall, a tension rod mounted on each pivot means and slidably connected to the upper wall, and adjustable means on the upper end of each tension rod adapted to apply force to said upper wall and through said pivot means and said links to the lower wall and by virtue of said outward spacing of said pivot means to said side walls, tending to urge said plates and walls inwardly to constrict said chamber, said tension rods having slide portions to cooperate with upper walls whereby adjustment of said adjustable means will alter the force applied to the walls and plates, said links and tension rods being disposed to transmit outward pressure on said plates to said walls, tending to urge said walls inwardly upon passing of a bale through said chamber, said outward spacing of said pivot means being such as to produce an included angle between each link and its associated tension rod within the range of 115° and 150°, so as to exert sufficient inward pressure on said plates in proportion to that on said upper and lower walls, that the frictional resistance to the passage of a bale offered by the walls will be substantially equal to the frictional resistance offered by the plates.

4. A baling chamber having relatively movable upper and lower walls in spaced relation, side walls between the lateral margins of the upper and lower walls, said side walls comprising plates having their upper and lower edges in spaced relation to the lateral margins of the upper and lower walls, means to prevent movement of said plates longitudinally of said chamber, pivot means on each plate spaced outwardly from the margins of said upper and lower walls, a link connected to each pivot means and pivotally connected to the adjacent lateral margin of the lower wall, a tension rod mounted on each pivot means and slidably connected to the upper wall, and adjustable means on the upper end of each tension rod adapted to apply force to said upper wall and through said pivot means and said links to the lower wall and, by virtue of said outward spacing of said pivot means to said side walls, tending to urge said plates and walls inwardly to constrict said chamber, said tension rods having slide portions to cooperate with said upper wall whereby adjustment of said adjustable means will alter the force applied to the walls and plates, said links and tension rods being disposed to transmit outward pressure on said plates to said walls, tending to urge said walls inwardly upon passing of a bale through said chamber, and said outward spacing of said pivot means being sufficient to produce sufficient inward pressure on said plates in proportion to that on said upper and lower walls that the frictional resistance to the passage of a bale offered by the walls will be substantially equal to the frictional resistance offered by the plates.

References Cited in the file of this patent

UNITED STATES PATENTS

| | | |
|---|---|---|
| 434,775 | Gehrt | Aug. 19, 1890 |
| 753,402 | Jacobs | Mar. 1, 1904 |
| 802,410 | Sanders | Oct. 24, 1905 |
| 1,065,648 | Wygant | June 24, 1913 |
| 1,076,288 | Jackson | Oct. 21, 1913 |
| 1,631,881 | Murray | June 7, 1927 |
| 2,327,067 | Russell | Aug. 17, 1943 |
| 2,411,467 | Russell | Nov. 19, 1946 |